United States Patent
Laursen et al.

(10) Patent No.: US 6,457,372 B1
(45) Date of Patent: Oct. 1, 2002

(54) FLOWMETER WITH FIRST AND SECOND MEASURING TUBES HAVING CORRECTING DEVICE FOR THE MEASURING TUBES, AND METHOD OF DETERMINING MASS FLOW RATE

(75) Inventors: Mogens Bech Laursen, Kolding; Henning Max Hansen, Sønderborg, both of (DK)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 09/719,597

(22) PCT Filed: Jul. 7, 1999

(86) PCT No.: PCT/DK99/00388

§ 371 (c)(1),
(2), (4) Date: Dec. 12, 2000

(87) PCT Pub. No.: WO00/04344

PCT Pub. Date: Jan. 27, 2000

(30) Foreign Application Priority Data

Jul. 14, 1998 (DE) .......................... 198 31 505

(51) Int. Cl.[7] ............................................. G01F 1/84
(52) U.S. Cl. ............................................. 73/861.356
(58) Field of Search ............... 73/861.355, 861.356, 73/861.357

(56) References Cited

U.S. PATENT DOCUMENTS

| | | | | |
|---|---|---|---|---|
| 4,852,409 A | * | 8/1989 | Herzl ..................... | 73/861.356 |
| 5,602,344 A | * | 2/1997 | Lew et al. ............. | 73/861.356 |
| 5,796,012 A | * | 8/1998 | Gomi et al. ........... | 73/861.356 |
| 5,804,742 A | * | 9/1998 | Rademacher-Dubbick ................ | 73/861.357 |

* cited by examiner

Primary Examiner—Harshad Patel
(74) Attorney, Agent, or Firm—Lee, Mann, Smith, McWilliams, Sweeney & Ohlson

(57) ABSTRACT

A flowmeter and a method of determining the mass flow rate. The flowmeter has a first measuring tube and a second measuring tube which are arranged in a common housing and are connected to one another mechanically. Also provided are an excitation device for exciting the measuring tubes to oscillation, and a detector device for detecting oscillation parameters which is connected to an evaluating device, which determines a mass flow rate signal for each measuring tube from output signals from the detector device. The object is to improve the measuring accuracy in cases in which identical conditions do not prevail in the measuring tubes. For that purpose, an amplitude detecting device is provided which detects the amplitude of the oscillation of each measuring tube, and a correcting device is connected to the evaluating device, which correcting device has a flow input and an amplitude input for each measuring tube.

14 Claims, 2 Drawing Sheets

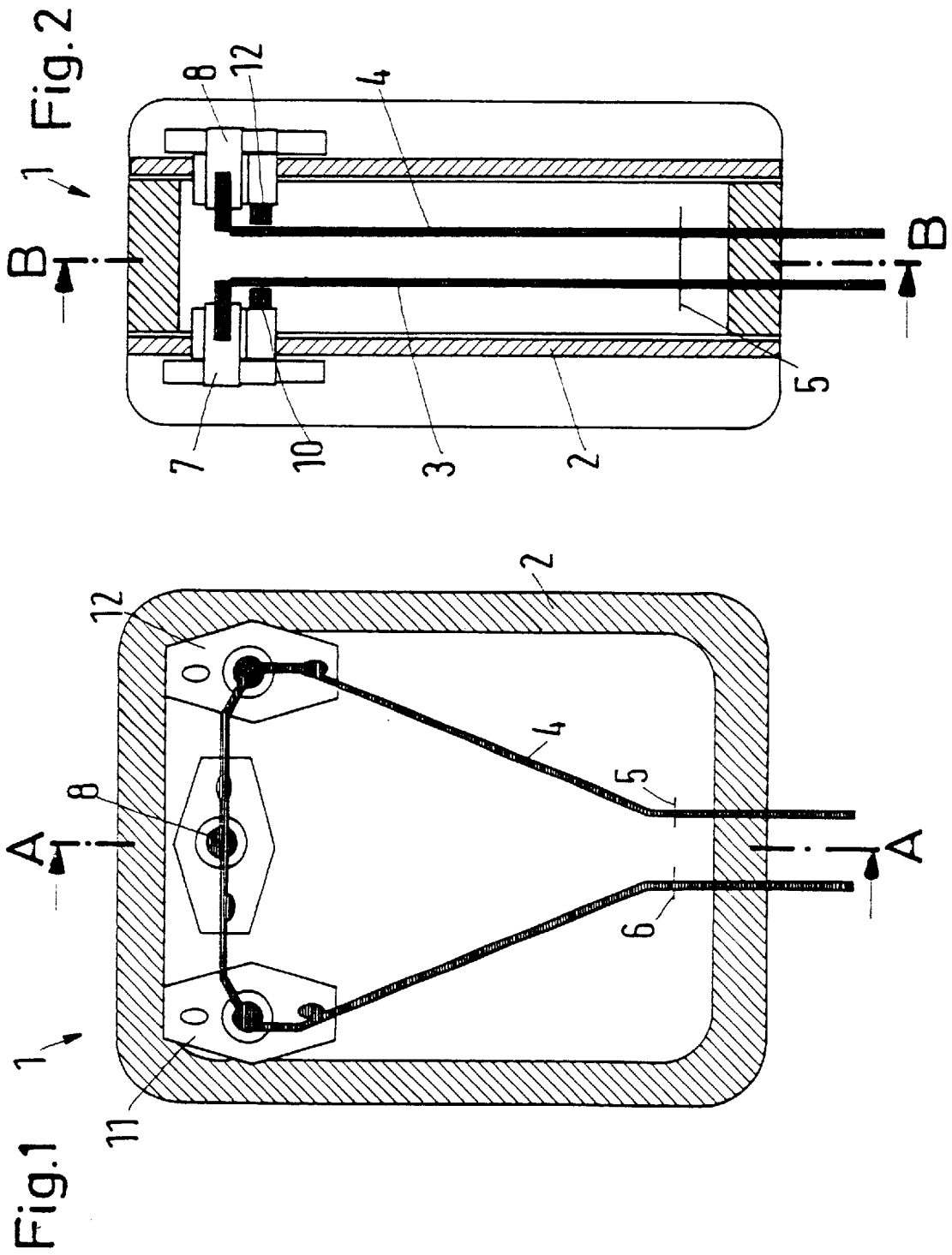

FLOWMETER WITH FIRST AND SECOND MEASURING TUBES HAVING CORRECTING DEVICE FOR THE MEASURING TUBES, AND METHOD OF DETERMINING MASS FLOW RATE

BACKGROUND OF THE INVENTION

The invention relates to a flowmeter having a first measuring tube and a second measuring tube which are arranged in a common housing and are connected to one another mechanically, an excitation device for exciting the measuring tubes to oscillation, a detector device for detecting oscillation parameters and an evaluating device, which determines a mass flow rate signal for each measuring tube from output signals from the detector device.

Such a flowmeter is known from WO 97/26508 A1. Using such a flowmeter, it is possible to determine the mass flow rate through each measuring tube and also the difference between or the sum of the two mass flows. Cases in which it is desirable to determine both the absolute value of the mass flow through each measuring tube and the difference between the mass flows are found, for example, in the field of medicine. In the case of purifying the blood of dialysis patients, the amount of fluid removed from the body must be monitored precisely. That amount appears in the process as a differential flow between the dialysate flow supplied and the dialysate flow removed, the latter being small in relation to the dialysate flow supplied. At the same time, it would of course also be desirable to discover the absolute amount of dialysate supplied.

Other applications are found in surface-coating technology, in which a certain amount must be held in store in a colour medium reservoir. It is therefore necessary to re-supply exactly the same amount of colour medium components as the amount of colour medium removed. For that reason, the difference in mass must be known. It would on the other hand of course also be desirable to know the absolute amount of colour medium used.

In the known flowmeter, basically two independent measuring systems operating according to the Coriolis principle are therefore used. Each measuring tube is excited to oscillation. The oscillation of the associated measuring tube is detected at a location other than at the point of excitation. The mass flow rate can then be determined from the phasing of the oscillation between the point of excitation and the measuring point or between two measuring points spaced from one another.

The oscillation is produced with respect to a housing and is also detected with respect to a housing. At the same time, the housing serves to secure the measuring tubes. Certain problems arise, however, as a result of the housing. The oscillations produced at the measuring tubes are transferred also to the housing or to a mechanical coupling between the tubes, which is provided to prevent oscillation loading at the point at which the tubes are fixed in the housing. The mechanical coupling between the tubes also forms an artificial node for the tubes when they are oscillating in opposite phase.

The mechanical coupling between the two measuring tubes is not critical provided the conditions in the two measuring tubes are identical, that is to say, when the through-flowing mass is approximately the same. That is the case in normal flowmeters, which detect only the difference between mass flows, because the two measuring tubes are then connected either in series or in parallel, see, for example, EP 0 244 692 A1. In that case, virtually no disturbances can be observed in the measurement result.

Problems arise, however, when the media flowing through the measuring tubes have different densities or different flow speeds or are subject to other different conditions. It has been shown that in such circumstances the measurement results do not reflect the true conditions with the necessary reliability.

SUMMARY OF THE INVENTION

The problem underlying the invention is to improve the measuring accuracy in cases in which identical conditions do not prevail in the measuring tubes.

The problem is solved in a flowmeter of the type mentioned at the beginning in that an amplitude detecting device is provided, which detects the amplitude of the oscillation of each measuring tube, and a correcting device is connected to the evaluating device, which correcting device has a flow input and an amplitude input for each measuring tube.

The flowmeter thus operates initially like a normal flowmeter according to the Coriolis principle. Each measuring tube is made to oscillate. A phase difference in the oscillations at various positions on each measuring tube is dependent upon the mass flow through the measuring tube. That phase difference (or other known values of measuring tubes operating according to the Coriolis principle) can be used to determine the mass flow, that is to say, the mass flowing through per unit time. The mass flow rate signal of each measuring tube is, however, subject to error. The "composition" of that error is now known. The amplitude of the oscillation of the other measuring tube and also the mass flow rate through the other measuring tube enter into this error. It is accordingly sufficient to supply those two values to the correcting device in order to form an error correction value and to correct the mass flow rate signal accordingly. Since the influence of one measuring tube on the other measuring tube and of the other measuring tube on the first measuring tube can be observed, only two further signals need be supplied to the correcting device in addition to the (error-affected) mass flow rate signals, namely the amplitudes of the two measuring tubes.

The amplitude detecting device is preferably combined with the detector device. For error correction, it is no longer even necessary to have separate sensors. All that is required is a type of signal generation, supplemented where appropriate. One is no longer obliged to determine only the phase displacement of the oscillation at various positions on a measuring tube, but it is possible to use one or more detectors to detect the amplitude as well.

Preferably the detector device has a separate detector arrangement for each measuring tube. The risk of further couplings' becoming involved via the detector device is thus reduced. In corresponding manner, the excitation device can have a separate excitation arrangement for each measuring tube, for example, an electromagnet. The risk of reciprocal couplings is, however, somewhat smaller in the case of excitation.

Advantageously the correcting device produces for each measuring tube a product of the flow, amplitude and a coupling coefficient of the respective measuring tube and feeds that product back to the mass flow rate signal from the other measuring tube. A certain transient process is of course necessary until an error-free mass flow rate signal has been obtained. By means of the backwards coupling, however, error correction can be obtained with relatively little outlay.

In an alternative construction, for each measuring tube the correcting device adds a product of the mass flow rate signal, amplitude and a coupling coefficient of one measuring tube to the mass flow rate signal of the other measuring tube and divides the sum by a factor which comprises the amplitudes of the measuring tubes. This is a case of forwards coupling or regenerative coupling. In that construction, a mass flow rate signal that is free of coupling errors is obtained in every operating state.

The correcting device is preferably in the form of an electronic circuit. By means of the electronic circuit, the individual coupling factors can be readily reproduced and coupled with the respective amplitudes.

It is, in that case, advantageous for the circuit to have a memory for the coupling coefficients. The coupling coefficients can then be determined in advance for each flowmeter and stored. They are then permanently available for further operation.

The invention relates also to a method of determining the mass flow rate through two measuring tubes which are coupled mechanically and are excited to oscillation, a mass flow rate signal being determined from oscillation parameters of each measuring tube.

The above-mentioned problem is solved in that method in that the mass flow rate signal for each measuring tube is corrected by means of a correction value which contains a coupling coefficient and the amplitude of the oscillation of the other measuring tube.

As explained above in connection with the flowmeter, in that manner "disturbances" which are exerted by the two measuring tubes on each other as a result of the mechanical coupling of the two measuring tubes, for example, by way of the housing or. by way. of fastening elements on the housing, can be eliminated. Those disturbances are not critical only as long as identical conditions prevail in the two measuring tubes, that is to say, identical mass flows, identical densities or identical temperatures.

When conditions are different, those disturbances amplify a measuring error. Since the composition of the measuring error has now been determined, it can be eliminated again. The measuring error is dependent, firstly, upon the amplitude of the other measuring tube and, secondly, upon the mass flow rate through that measuring tube. The equipment-related disturbances can be combined in a constant coupling coefficient.

It is, in that case, preferable for the correction value to be formed by the product of the amplitude, coupling coefficient and corrected mass flow rate signal, the correction value being added with the opposite sign to the uncorrected mass flow rate signal such as a disturbance caused by the mechanical coupling. That correction method is a case of backwards coupling. The issue as to what effect the disturbance has upon the mass flow rate signal can be readily determined in advance. The backwards coupling must then operate with the opposite sign. When, for example, the disturbance has the effect of reducing the mass flow rate signal, the backwards coupling must carry out an addition.

In an alternative construction, the correction value is formed by the product of the uncorrected mass flow rate signal, amplitude and coupling coefficient of one measuring tube, which is added to the uncorrected mass flow rate signal of the other measuring tube, the sum being normalized to a value dependent upon both amplitudes. That is a case of forwards coupling or regenerative coupling. This has the advantage of delivering an error-free signal in every operating state.

Advantageously the coupling coefficients and, where appropriate, their temperature dependency are determined in advance by calibration. The coupling coefficients can be determined even during manufacture or in a subsequent step and can then be imparted permanently to the corresponding flowmeter. The coupling coefficients are basically dependent upon only mechanical influences, which do not alter during operation if the temperature remains constant. If changing temperatures are to be expected, the temperature dependency of the coupling coefficients can also be determined during calibration and that dependency can then be described mathematically, for example, by a polynomial.

The calibration is effected advantageously in that a flow passes through one measuring tube during calibration, but not through the other measuring tube. In that case it is possible to determine relatively precisely the effect of the oscillation of one measuring tube on the other.

BRIEF DESCRIPTION OF THE DRAWINGS

The invention is described hereinafter in greater detail with reference to preferred embodiments, in conjunction with the drawings, in which:

FIG. 1 is a section through a flowmeter along the line B—B according to FIG. 2;

FIG. 2 is a section A—A according to FIG. 1;

DESCRIPTION OF THE PREFERRED EMBODIMENT

Figure 3:
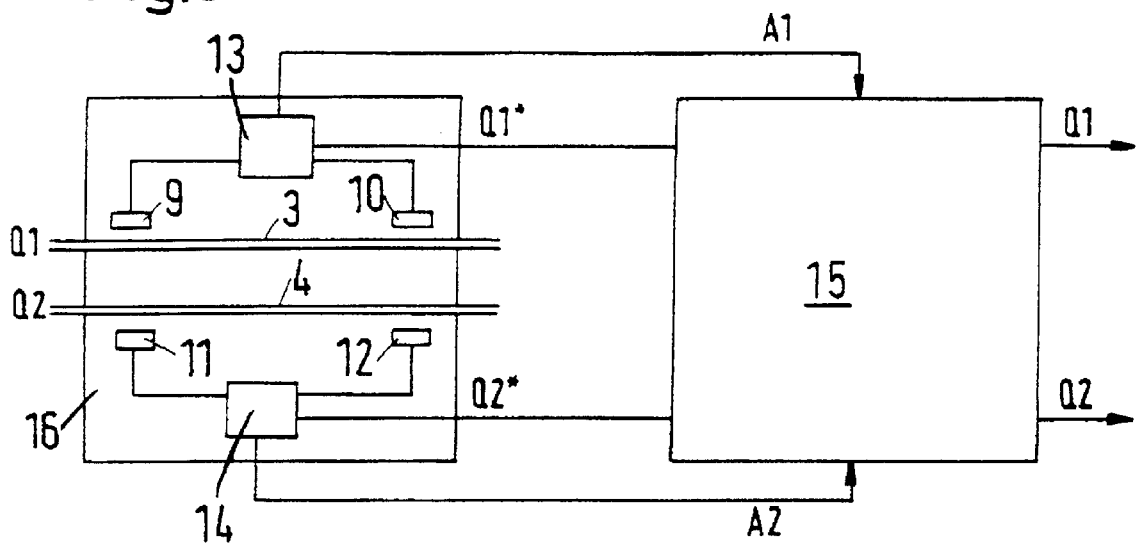
FIG. 3 is a diagrammatic circuit diagram.

A flowmeter 1 shown in FIGS. 1 and 2 has a housing 2 in which there are arranged a first measuring tube 3 and a second measuring tube 4. The two measuring tubes are coupled to one another mechanically by mechanical connections 5, 6. The connections 5, 6 are shown only diagrammatically. They are known per se and are intended to prevent mechanical oscillations from loading the fastening of the measuring tubes 3, 4 to the housing 2. Even when there are no connections 5, 6, mechanical coupling takes place between the two measuring tubes 3, 4, in that case via the housing 2.

Each measuring tube 3, 4 has an excitation device 7, 8, for example an electromagnet, which makes the corresponding measuring tube 3, 4 oscillate. Each measuring tube also has two sensors 9, 10 and 11, 12, respectively, which detect the oscillation behaviour of the measuring tubes 3, 4 at a certain distance, viewed in the direction of flow, from the excitation device 7, 8.

The flowmeter 1 operates according to the Coriolis principle. When there is no flow through the measuring tube 3, 4, the oscillation produced by the excitation device 7, 8 is then transferred away along the measuring tube 3, 4 uniformly to both ends. The two sensors 9, 10 and 11, 12 arranged at the same distance from the excitation device 8 will accordingly be able to detect like-phased oscillation.

If, however, there is a mass flow through the oscillating measuring tube 3, 4, for example, a fluid or a gas, a phase shift then occurs between the two sensors 9, 10 and 11, 12 on account of the Coriolis force thereby produced. The mass flow or mass flow rate per unit time can be determined from that phase shift. It is not absolutely necessary for two sensors 9, 10 and 11, 12 to be present. The phase shift can also be detected between the excitation device 7, 8 and one sensor. Basically, any other values known of mass flowmeters operating according to the Coriolis principle can be used to determine the mass flow.

Whereas FIGS. 1 and 2 show the mechanical structure, FIG. 3 shows diagrammatically the operational context.

Mass flows Q1 and Q2 pass through the two measuring tubes 3, 4, respectively. The sensors 9, 10 and 11, 12 accordingly detect the excursion of the measuring tubes 3, 4 at the positions in question. By means of an evaluating device 13, 14, mass flow rate signals Q1* and Q2* are formed, for example, from the phase shift discussed above.

On account of the mechanical coupling between the two measuring tubes 3, 4, the mass flow rate signals Q1*, Q2* are, however, subject to error. That error is based on the fact that the oscillations of each measuring tube 4, 3 feed back to the other measuring tube 3, 4 by way of the mechanical coupling. The feedback is in this case dependent upon the mass flow flowing through the other measuring tube 4, 3 and upon the amplitude with which the measuring tube 4, 3 is oscillating. The greater the amplitude is, the greater is the disturbance affecting the other measuring tube. The same applies also to the mass flow, as can be readily imagined. Provided the same medium is flowing through the two measuring tubes 3, 4 and provided the measuring tubes 3, 4 receive the same mass flow, the two disturbances cancel each other out and have no noticeable disturbing effect. If, however, different media flows are flowing through the two measuring tubes, that is to say having differences, for example, in density or in flow speed, there are then in some cases considerable departures in the mass flow rate signals Q1*, Q2* from the actual mass flow rates Q1, Q2.

As can be seen from FIGS. 4 and 5, the disturbance-affected mass flow rate signals Q1*, Q2* can be represented as follows:

$$Q1^* = Q1 - Q2 \cdot K21 \cdot A2$$

$$Q2^* = Q2 - Q1 \cdot K12 \cdot A1$$

In those equations A1 and A2 are the amplitudes with which the measuring tubes oscillate when the mass flows Q1, Q2 flow through them. The coefficients K12 and K21 are coupling coefficients with which Q1 acts upon Q2 (Kl2) and Q2 acts upon Q1 (K21), respectively.

In order to eliminate that error, the evaluating device 13, 14 determines not only the mass flow rate signal Q1*, Q2* but also the amplitude A1, A2 of the oscillations of the measuring tubes 3, 4. The amplitude can be detected, for example, by forming a mean value from the excursions oil each measuring tube 3, 4 detected by the sensors 9, 10 and 11, 12, respectively.

Both the mass flow rate signals Q1*, Q2* and the two amplitudes A1, A2 are sent to a correcting device 15, the manner of operating of which will be explained with reference to FIGS. 4 and 5.

Figure 4:
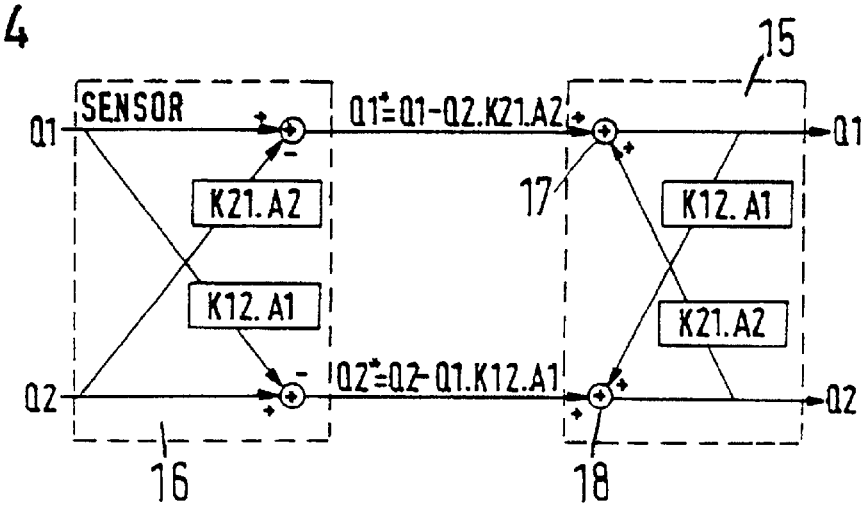
FIG. 4 is a diagrammatic representation of an error correction operation.

FIG. 4 is a first diagrammatic representation. For the purpose of clarity, as in FIG. 3, a box 16 has been sketched in to bring together certain elements from an operational point of view. It is, of course, clear that this does not mean that all those elements are housed in a common housing or that those elements must be in the form of discrete components.

As already explained, at the output of the evaluating device 13 there is an error-affected mass flow rate signal Q1 and at the output of the evaluating device 14 there is an error-affected mass flow rate signal Q2*. The error arises from the fact that the coupling factor K12 and the amplitude A1 and the coupling factor K21 and the amplitude A2 influence the "true" mass flow rates Q1 and Q2, respectively. In the present embodiment, it is assumed that the error is subtracted from the true mass flow rate Q1, Q2.

In order to eliminate that error, two addition points 17, 18 are provided in the correcting device 15. At the addition point 17 the error-affected mass flow rate signal Q1* and a correcting factor are added, the latter being formed by a mass flow rate signal Q2 that has been taken after the addition point 18 and is thus "error-free". In similar manner, at the addition point 18 the error-affected mass flow rate signal Q2* and a correcting factor are added, the latter being formed by the product of the "error-free" mass flow rate signal Q1, the coupling factor K12 and the amplitude A1.

The mass flow rate signal Q1* or Q2* is thus corrected by backwards coupling. After a short initial phase, disturbance-free mass flow rate signals Q1 and Q2 are indeed available after the addition points 17, 18, with the result that the correction operation can proceed accordingly.

The coupling coefficients K12 and K21 can be determined in advance by calibration. They are basically dependent only upon mechanical parameters of the flowmeter 1 and thereby upon the temperature. That temperature dependency can also be determined during calibration and can be described adequately, for example, by a polynomial.

For the calibration, firstly a known mass flow Q1 is passed through the measuring tube 3. No flow passes through the measuring tube 4. An error-affected mass flow rate signal Q2*=−Q·K12·A1 is then produced, from which the coupling coefficient K12 can be calculated, because both Q1 and A1 are known or can be measured. The coupling factor K21 can also be determined in similar manner when there is a flow through the measuring tube 4 and there is no flow through the measuring tube 3. The coupling coefficients K12, K21 can then be stored in a memory that is present in the correcting device 15, which is preferably in the form of an electronic circuit. The term "electronic circuit" is to be understood as including miniaturized circuits also, that is to say, for example, those that can be stored on a microchip.

Figure 5:
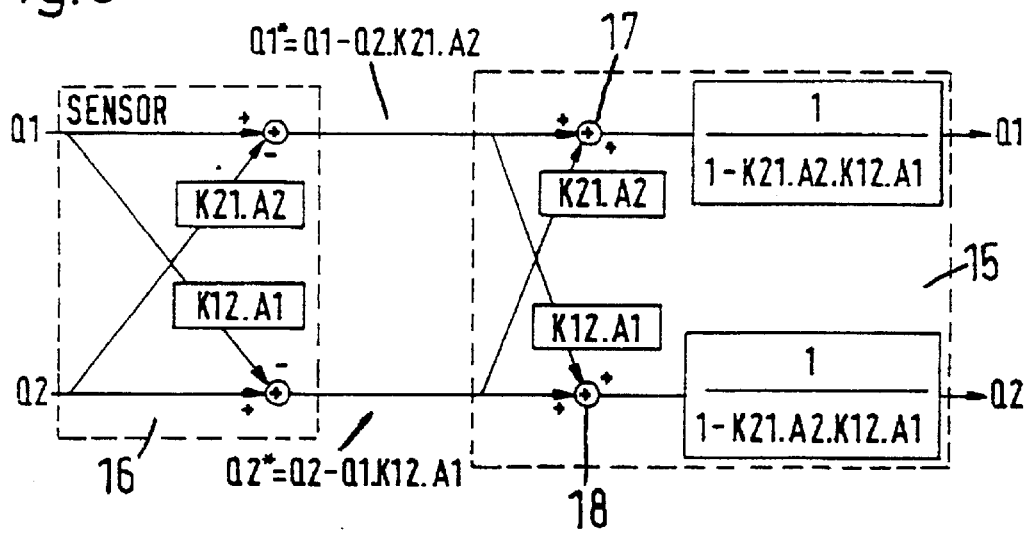
FIG. 5 is a diagrammatic representation of an alternative error correction operation.

Whereas the embodiment according to FIG. 4 effects error correction by backwards coupling, FIG. 5 shows an embodiment in which the error correction is effected by forwards coupling or regenerative coupling.

The relationships at the output of the box 16 are the same. The correcting device 15 also has two addition points 17, 18. In contrast to the construction according to FIG. 4, in which the correction values are taken after the addition points 17, 18, in this case a correction value is formed from the uncorrected mass flow rate signal Q1*, the coupling coefficient K12 and the amplitude A1 and from the uncorrected mass flow rate signal Q2*, the coupling coefficient K21 and the amplitude A2. The coupling coefficients K12 and K21 were determined in advance by calibration in the same manner as that described in the context of FIG. 4.

After the addition points 17, 18 a signal is then available which must still be divided by a term (1−K21·A2·K12·A1) in order to obtain the "true" mass flow rate Q1, Q2.

In both embodiments, all that is required is for the two error-affected mass flow rate signals Q1* and Q2* and the two amplitudes A1 and A2 to be sent to the correcting device 15 in order to be able to carry out a correction operation.

What is claimed is:

1. Flowmeter having a first measuring tube and a second measuring tube which are arranged in a common housing and which are connected to one another mechanically, an excitation device for exciting the measuring tubes to oscillation, a detector device for detecting oscillation parameters, an evaluating device which determines a mass flow rate signal for each measuring tube from output signals from the detector device, the evaluating device further determining the amplitude of the oscillation of each measuring tube, a correcting device connected to the evaluating device, which correcting device has a flow input and an amplitude input for each measuring tube, and in which the correcting device corrects the output signal from one measuring tube by using the amplitude input and the flow input of the other measuring tube.

2. Flowmeter according to claim 1 in which the amplitude detecting device is part of the detector device.

3. Flowmeter according to claim 1 in which the detector device comprises a separate detecting arrangement for each measuring tube.

4. Flowmeter according to claim 3 in which each detector device comprises a pair of sensors.

5. Flowmeter according to claim 1 in which the correcting device forms for each measuring tube a product of mass flow, amplitude and a predetermined coupling coefficient of the other measuring tube and feeds that product back to the mass flow rate signal of the other measuring tube.

6. Flowmeter according to claim 1 in which for each measuring tube the correcting device adds a product of the mass flow rate signal, amplitude and a predetermined coupling coefficient of one measuring tube to the mass flow rate signal of the other measuring tube and divides the sum by a factor that comprises the amplitudes of the measuring tubes.

7. Flowmeter according to claim 1 in which the correcting device comprises an electronic circuit.

8. Flowmeter according to claim 7 in which the electronic circuit includes a memory for coupling coefficients.

9. Method of determining mass flow rate through two measuring tubes that are coupled mechanically and are exited to oscillation, comprising determining a mass flow rate signal from oscillation parameters of each measuring tube, and correcting the mass flow rate signal for each measuring tube by means of a correction value which comprises a coupling coefficient and the mass flow rate signal of the other tube and the amplitude of the oscillation of the other tube.

10. Method according to claim 9 in which the correction value is formed by the product of the amplitude, coupling coefficient and corrected mass flow rate signal, the correction value being added with an opposite sign to the uncorrected mass flow rate signal.

11. Method according to claim 9 in which the correction value is formed by the product of the uncorrected mass flow rate signal, amplitude and coupling coefficient of one measuring tube, which correction value is added to the uncorrected mass flow rate signal of the other measuring tube, and the sum is normalized to a value dependent upon both amplitudes.

12. Method according to claim 9 in which the coupling coefficients is determined in advance by calibration.

13. Method according to claim 12 in which temperature dependency of the coupling coefficients is also determined in advance by calibration.

14. Method according to claim 12 in which in the calibration a flow passes through one measuring tube but not through the other.

* * * * *